US009376757B2

(12) United States Patent
Carrilero Borbujo et al.

(10) Patent No.: US 9,376,757 B2
(45) Date of Patent: Jun. 28, 2016

(54) SPEEK DIAPHRAGM FOR ALKALINE ELECTROLYSIS AND ITS USE

(75) Inventors: Isabel Carrilero Borbujo, Navarra (ES); Maria Santa Maria Iruzubieta, Navarra (ES); Manuel Arruebo Gordo, Zaragoza (ES); Jesus Otero Cebrian, Zaragoza (ES); Silvia Irusta Alderete, Zaragoza (ES); Javier Sese Monclus, Zaragoza (ES)

(73) Assignees: INGETEAM POWER TECHNOLOGY, S.A., Bizkaia (ES); ACCIONA ENERGÍA, S.A., Sarriguren (Navarra) (ES)

( * ) Notice: Subject to any disclaimer, the term of this patent is extended or adjusted under 35 U.S.C. 154(b) by 208 days.

(21) Appl. No.: 14/367,432

(22) PCT Filed: Dec. 20, 2011

(86) PCT No.: PCT/ES2011/070884
§ 371 (c)(1),
(2), (4) Date: Jun. 20, 2014

(87) PCT Pub. No.: WO2013/093126
PCT Pub. Date: Jun. 27, 2013

(65) Prior Publication Data
US 2014/0332403 A1 Nov. 13, 2014

(51) Int. Cl.
*C25B 13/08* (2006.01)
*C25B 1/10* (2006.01)
(Continued)

(52) U.S. Cl.
CPC .............. *C25B 13/08* (2013.01); *B29C 39/003* (2013.01); *B29C 39/02* (2013.01); *C25B 1/10* (2013.01);
(Continued)

(58) Field of Classification Search
CPC ........ C25B 13/08; C25B 1/10; B29C 39/003; B29C 39/02; H01M 8/1025; H01M 8/1062; B29K 2071/00; B29L 2007/00; B29L 2031/34
See application file for complete search history.

(56) References Cited

U.S. PATENT DOCUMENTS

| 4,820,419 A | 4/1989 | Hendy et al. |
| 4,992,485 A | 2/1991 | Koo et al. |

(Continued)

FOREIGN PATENT DOCUMENTS

| EP | 0 382 356 A2 | 8/1990 |
| WO | 93/15529 A1 | 8/1993 |

OTHER PUBLICATIONS

Hentze et al., "Porous polymers and resins for biotechnological and biomedical applications," Reviews in Molecular Biotechnology 90 (2002) 27-53.*

(Continued)

*Primary Examiner* — Nicholas A Smith
(74) *Attorney, Agent, or Firm* — Sughrue Mion, PLLC (57) ABSTRACT

The present invention describes a diaphragm comprising SPEEK for alkaline electrolysis with a first layer having micropores and a second layer of macroporous channels which start at the contact surface between the first and the second layer then extending and forming the outer surface of the second layer, where said macroporous channels increase in section and change direction as they approach said outer surface of the second layer, and where the walls of the macrochannels are in turn macroporous. The invention also describes a production method for producing the diaphragm comprising the use of the chemically induced phase separation (CIPS) technique, and its use in alkaline electrolysis and in electrolyzers.

14 Claims, 4 Drawing Sheets

(51) Int. Cl.
*B29C 39/00* (2006.01)
*B29C 39/02* (2006.01)
*H01M 8/10* (2016.01)
*B29K 71/00* (2006.01)
*B29L 7/00* (2006.01)
*B29L 31/34* (2006.01)
*B29L 31/00* (2006.01)

(52) U.S. Cl.
CPC .......... *H01M 8/1025* (2013.01); *H01M 8/1062* (2013.01); *B29K 2071/00* (2013.01); *B29L 2007/00* (2013.01); *B29L 2031/34* (2013.01); *B29L 2031/755* (2013.01); *Y02E 60/366* (2013.01); *Y02E 60/521* (2013.01); *Y02P 70/56* (2015.11)

(56) References Cited

U.S. PATENT DOCUMENTS

2008/0004443 A1 1/2008 Brunelle et al.
2009/0092880 A1* 4/2009 Kim .................. C08G 65/48
429/493

OTHER PUBLICATIONS

International Search Report dated Dec. 3, 2012, issued by the International Bureau in corresponding International Application No. PCT/ES2011/070884.

Vermeiren P et al: "Evaluation of the Zirfon® separator for use in alkaline water electrolysis and Ni-H2 batteries", International Journal of Hydrogen Energy, Elsevier Science Publishers B.V., Barking, GB, vol. 23, No. 5, May 1, 1998, pp. 321-324, XP004107971, ISSN: 0360-3199.

* cited by examiner

SPEEK DIAPHRAGM FOR ALKALINE ELECTROLYSIS AND ITS USE

CROSS REFERENCE TO RELATED APPLICATIONS

This is a National Stage of International Application No. PCT/ES2011/070884 filed Dec. 20, 2011, the contents of which are incorporated herein by reference in its entirety.

FIELD OF THE INVENTION

The present invention is encompassed within the field of water electrolysis for generating pure gases, hydrogen and oxygen. The invention particularly relates to a new diaphragm for use in alkaline electrolysis comprising sulfonated polyether ether ketone (SPEEK) and furthermore optionally comprising ceramic particles as filling material or polyethersulfone (PES) forming a composite. The invention also relates to a production method for producing said diaphragm, as well as to its use in alkaline electrolysis.

BACKGROUND OF THE INVENTION

Alkaline electrolysis is an electrochemical process which dissociates water into hydrogen and oxygen by means of applying electric current. It is carried out in an electrolyzer comprising a tank, a cathode, an anode and two compartments separated by a porous and semipermeable diaphragm, repeatedly stacked. Water splitting is due to two redox half-reactions occurring at the electrodes, hydrogen being generated at the cathode and oxygen at the anode. The overall reaction can be described in the following manner:

$$2H_2O(l) \rightarrow 2H_2(g) + O_2(g); \quad E_0 = +1.229 \text{ V}$$

The necessary ion exchange is carried out by means of using an electrolyte.

Therefore the reduction reaction occurs at the cathode (with a negative charge) where the water is dissociated into hydrogen gas and hydroxyl ions. Said ions migrate through a diaphragm towards the anode (with a positive charge) where they are oxidized to yield water, oxygen and two free electrons which migrate towards the cathode, closing the circuit. The resulting gases are collected at the respective electrodes.

The electrolyte used in this type of electrolyzer is generally sodium or potassium hydroxide. The ionic conductivity of said electrolyte depends on its concentration, the concentration for which said conductivity is the maximum at the working temperature being chosen. The role of the electrolyte is to close the electric circuit allowing the passage of ions but not electrons between both electrodes.

As has been mentioned previously, the anode and cathode are separated by a porous and semipermeable diaphragm which must allow the passage of electrolyte (OH$^-$) and prevent, however, the gas bubbles from permeating through it thus preventing said gas bubbles which are generated in each cell (H$_2$ and O$_2$) from recombining to reproduce water, which can results in explosive mixtures since it is a highly exothermic reaction. The diaphragm causes molecular sieving as both gases go from one chamber to the other, which gases, once having been generated at the corresponding electrode, rise to the top of the electrolyzer due to their lower density compared with that of the electrolyte. The energy necessary for carrying out said electrolysis is supplied in the form of electric energy.

The requirements which must be met by the diaphragms for effective and safe application in alkaline electrolysis are very restrictive. They must show sufficient mechanical strength and chemical resistance, considering the highly alkaline conditions of the electrolyte used (i.e., NaOH, KOH (20-33 wt. %) at 40-90° C.). They must further be porous and semipermeable, such that they allow the flow of the electrolyte but not that of the generated gases (H$_2$/O$_2$), i.e., they must have a high bubble point pressure for said gases. The diaphragms must be hydrophilic and have low electrical resistance and high ionic conductivity. Logically, the materials making them up must preferably be environmentally friendly. Since the efficiency of the electrolysis increases by increasing the temperature, it is also desirable that the diaphragms withstand the corrosive conditions of the electrolyte over long time periods and preferably at high temperatures (up to 150° C.).

In the state of the art various materials are used for manufacturing different diaphragms, but in general, none satisfactorily meet all the mentioned requirements, some even having serious drawbacks. Some of these materials and their drawbacks are shown below.

Asbestos fibers, for example, have been used in membrane manufacturing but they were quickly replaced with other materials after it was demonstrated that they are very harmful to the environment.

Polytetrafluoroethylene (PTFE) and its derivatives have been used for manufacturing diaphragms but since they are highly hydrophobic polymers, it is necessary to add considerable amounts of wetting agents to them to increase their hydrophilicity, such as zirconium oxide, titanates, and doped titanates, which complicates their production method. Furthermore, the use of these diaphragms has the drawback that the efficiency of the electrolysis process is very low and the energy necessary to produce hydrogen is high.

The same occurs with other polymers, such as polyfluoroethylene propylene, polyarylethersulfone, polyperfluoroalkylvinyl ether, polyphenyl sulfur, which need to incorporate ceramic materials, such as zirconates or titanates to improve their wetting. Their manufacturing method is very complex and requires techniques such as cold rolling or by means of casting. In the case of the mentioned polymers, their functionality is limited.

It has been demonstrated that microporous polysulfone diaphragms can be used in alkaline electrolyzers; nevertheless, they have the drawback that their hydrophilicity is reduced.

Commercial membranes such as Zirfon® (polysulfone with zirconium oxide microparticles) have been designed for solving said hydrophobicity limitation, but have some drawbacks such as, for example, their production, which is very costly.

Nickel oxide (NiO) has also been used for manufacturing diaphragms but it is potentially toxic for the environment due to the Ni leaching potential.

Cermet composite materials (metal materials containing nickel and ceramic oxide particles embedded in a mesh of said metal) have been used for manufacturing diaphragms but have the same environmental drawbacks previously described for Ni leaching.

Metal materials have the limitation of being electrically conductive, which makes their incorporation on a electrolytic cell with zero-gap configuration unattainable. Furthermore, only the noble metals from the platinum group have sufficient chemical resistance for said application, however, neither Ni nor Zr are sufficiently passivated to assure the long-term stability in electrolytic conditions for diaphragms manufactured by sintering.

Self-supporting ceramic materials, i.e., those not needing a matrix of another material which provides mechanical strength to the set, such as zirconium oxide, titanates and zirconates (i.e., $NiTiO_3$, $ZrO_2$, $TiO_2$, $BaZrO_3$, $BaTiO_3$, $CaZrO_3$, $CaTiO_3$) can be sintered in controlled conditions to achieve suitable microporosity allowing the flow of fluids (electrolyte) but not that of the gas bubbles generated in the electrolyzer. These materials have the required chemical resistance, but low mechanical strength since they are easily friable and peel-off. Sintering a diaphragm made up of only defect-free (macropores) large ceramics is technologically complex. Furthermore, the different coefficients of expansion between a ceramic material (the diaphragm) and a metal material (the electrolyzer casing) make preventing cracks in the ceramics after being subjected to high temperatures very difficult.

OBJECT OF THE INVENTION

Therefore there is still a need in the state of the art to provide a new diaphragm for efficient and safe use in alkaline electrolysis and a new alkaline electrolysis method which at least partially overcomes the drawbacks mentioned above.

The solution provided by the present invention is based on the fact that the inventors have discovered that it is possible to produce a new porous and semipermeable diaphragm for alkaline electrolysis comprising SPEEK, and furthermore optionally comprising a ceramic material, a polyethersulfone or a mixture thereof, which is highly effective and safe for use in an alkaline electrolysis method. The use of this new diaphragm allows carrying out a new alkaline electrolysis method having, among other advantages, a greater efficiency and producing low HTO (Hydrogen to Oxygen, hydrogen in the oxygen stream) values, i.e., a very effective separation of the hydrogen and oxygen gases produced compared with the conventional diaphragms which are currently marketed today. Achieving high purity hydrogen is a key objective for competing, for example, in the food or fuel cell markets. The electrolytic hydrogen has an advantageous position in said markets with respect to the hydrogen produced by reforming since it is not contaminated with $CO_2$ or hydrocarbons. Nevertheless, the current hydrogen quality specifications SAEJ2719, ISO/FDTS 14687-2 are becoming progressively stricter to cover the increasingly stricter requirements and the $O_2$ concentration in the $H_2$ stream has also become a critical factor therefore a high-efficiency membrane for the separation of $H_2$ and $O_2$ prevents expensive post-production processes.

In the case of oxygen there is the need in the state of the art to provide high purity streams to enable using it as medicinal oxygen (hospitals, retirement homes etc.), aquaculture oxygen or purification oxygen for purifying waste water.

Therefore, in one aspect the invention relates to a SPEEK diaphragm, and furthermore optionally relates to a component selected from the group consisting of ceramic particles, polyethersulfone and mixtures thereof for alkaline electrolysis having the following structure: a first microporous layer and a second layer having macroporous channels, where said macroporous channels start at the contact surface between the first and the second layer then extending and forming the outer surface of said second layer, where said macroporous channels increase in section and change direction as they approach said outer surface of said second layer, and where the wall of said macroporous channels has macropores.

Said diaphragm, hereinafter the diaphragm of the invention, can be produced in a simple manner and at a low cost by means of the chemically induced phase separation (CIPS) technique. Therefore in another aspect the invention relates to a production method for producing the diaphragm of the invention comprising the steps of:

(i) preparing a solution comprising SPEEK
(ii) casting the solution on a support for preparing a film with a controlled thickness
(iii) immersing the film in a bath containing a non-solvent
(iv) washing
(v) drying and
(vi) cold rolling the diaphragm.

The diaphragm of the invention has a high mechanical stability, even, and a very reduced thicknesses, and thicknesses less than the thicknesses of the membranes conventionally used in alkaline electrolysis such as, for example, Zirfon® or polysulfone membranes. This fact is very advantageous inasmuch as it allows considerably reducing the amount of raw material necessary for manufacture, and therefore the manufacturing cost of the diaphragms since these raw materials are generally very expensive. Furthermore, the reduced thickness of the diaphragm of the invention is advantageous inasmuch as it allows that the energy necessary for carrying out the alkaline electrolysis is generally lower and therefore the alkaline electrolysis is more efficiently performed.

In another aspect the invention relates to an alkaline electrolysis method comprising the use of at least one porous and semipermeable diaphragm of the invention.

Finally, in another aspect the invention relates to an electrolyzer comprising at least one diaphragm of the invention.

DESCRIPTION OF THE INVENTION

In a first aspect the invention relates to a porous and semipermeable diaphragm comprising SPEEK, hereinafter the diaphragm of the invention. The diaphragm of the invention has the following structure: a first microporous layer and a second layer having macroporous channels, where said macroporous channels start at the contact surface between the first and the second layer then extending and forming the outer surface of said second layer, where said macroporous channels increase in section and change direction as they approach said outer surface of said second layer, and where the wall of said macroporous channels has macropores.

In the context of the present invention, "microporous layer" has to be understood as a layer having micropores, i.e. pores with a mean size less than 2 nm, and "macroporous channels", as channels with section greater than 50 nanometers, and "macropores", as pores with a mean size greater than 50 nanometers.

Figure 1:
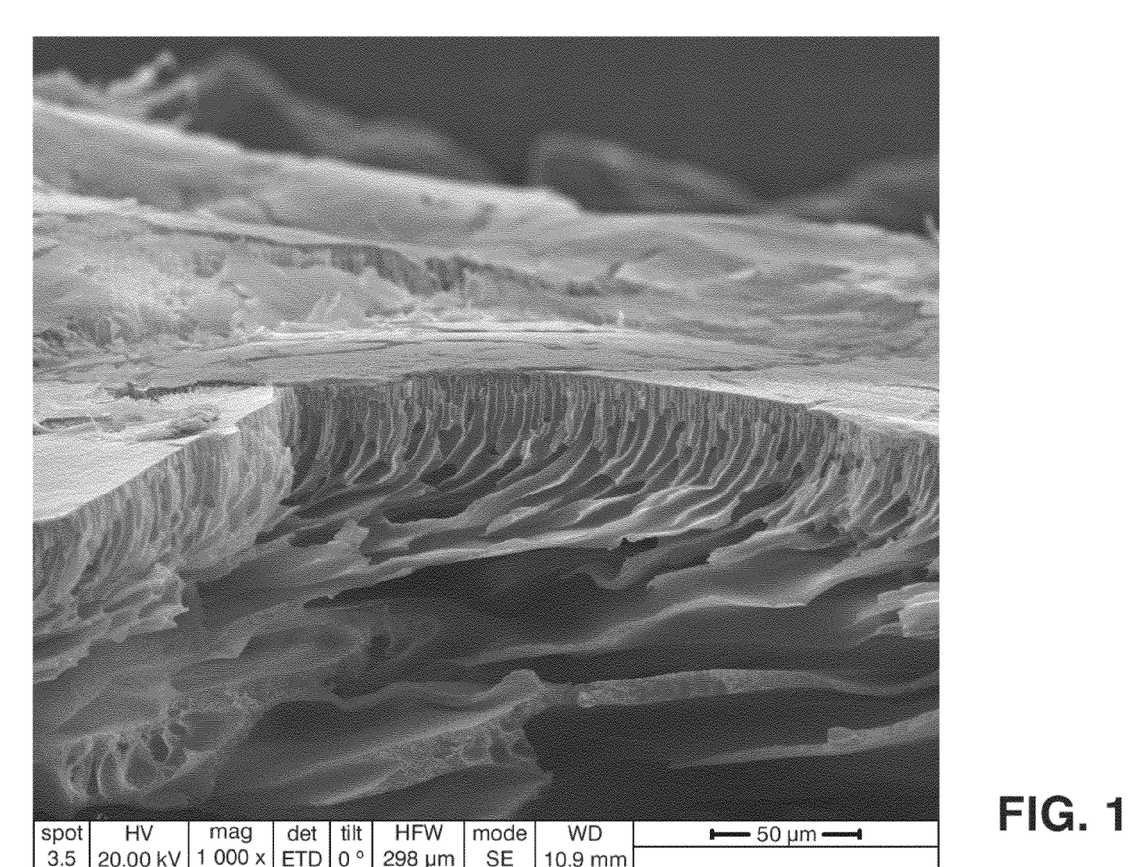
FIG. 1 shows a scanning electron microscopy (SEM) image of the cross-section of a diaphragm of the invention.
Figure 2:
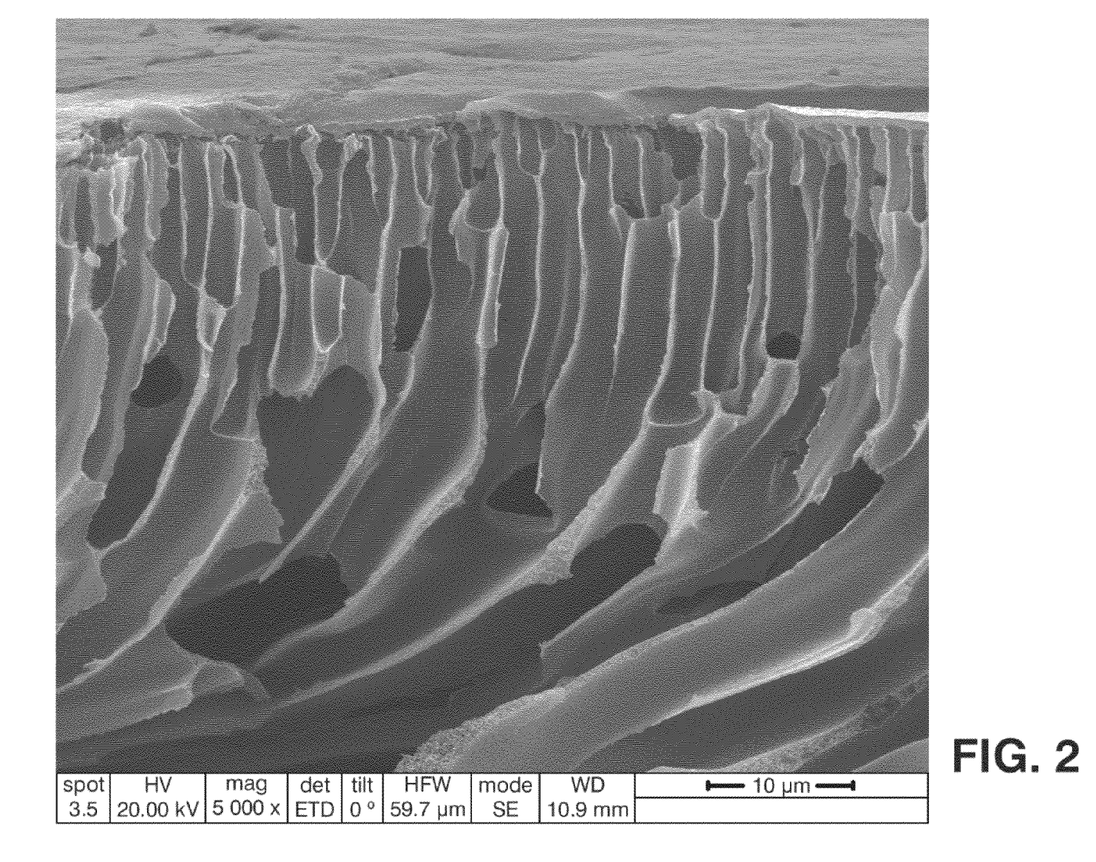
FIG. 2 shows a scanning electron microscopy (SEM) image of the cross-section of a diaphragm of the invention.
Figure 3:
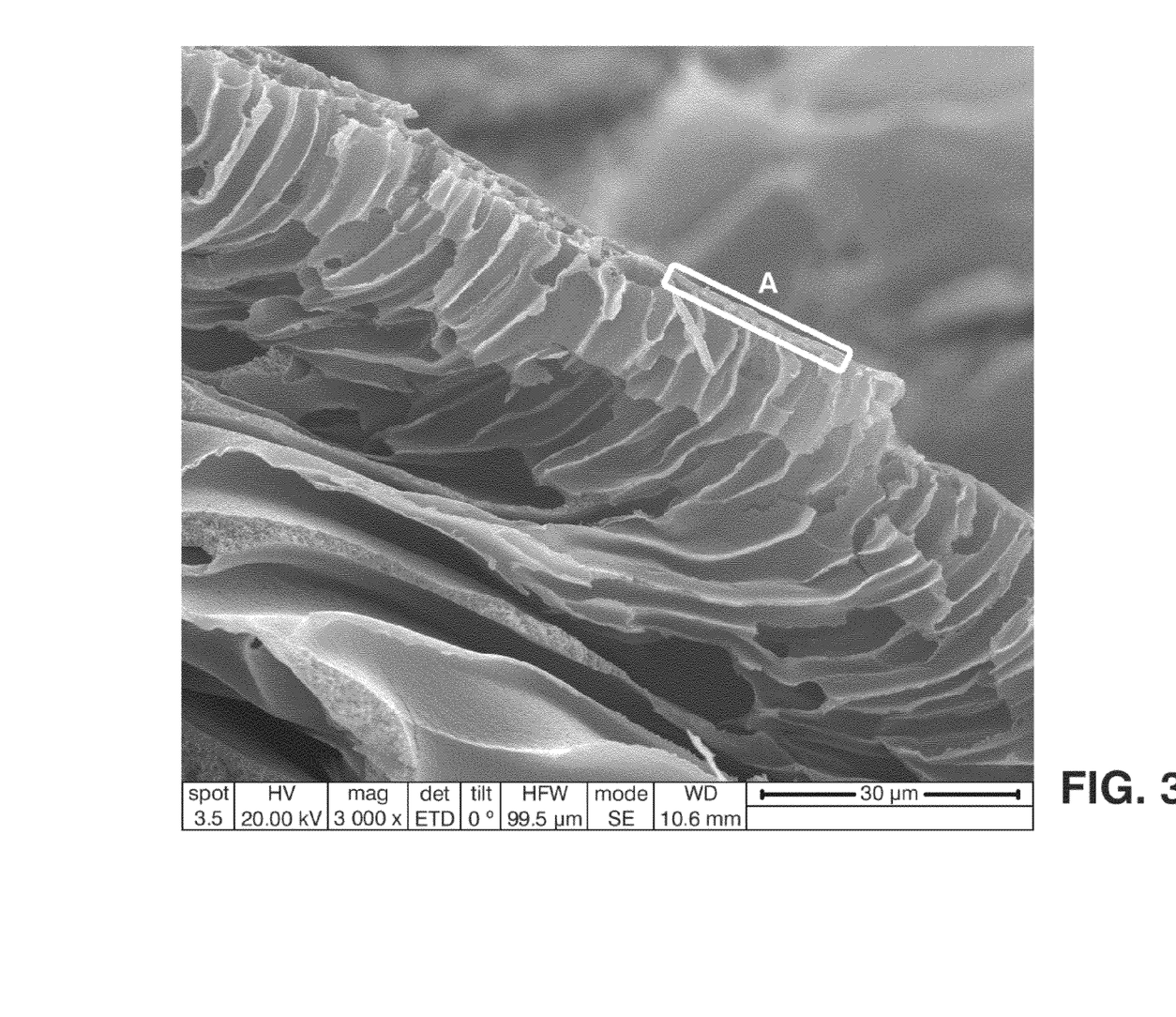
FIG. 3 shows a scanning electron microscopy (SEM) image of the cross-section of a diaphragm of the invention.

The structure of several diaphragms according to the present invention is shown in the scanning electron microscopy (SEM) images of different cross-sections thereof (FIGS. 1 to 3).

The equipment used for producing the SEM images is an Inspect™ F high vacuum ($10^{-7}$ mbar) scanning electron microscope.

Figure 4:
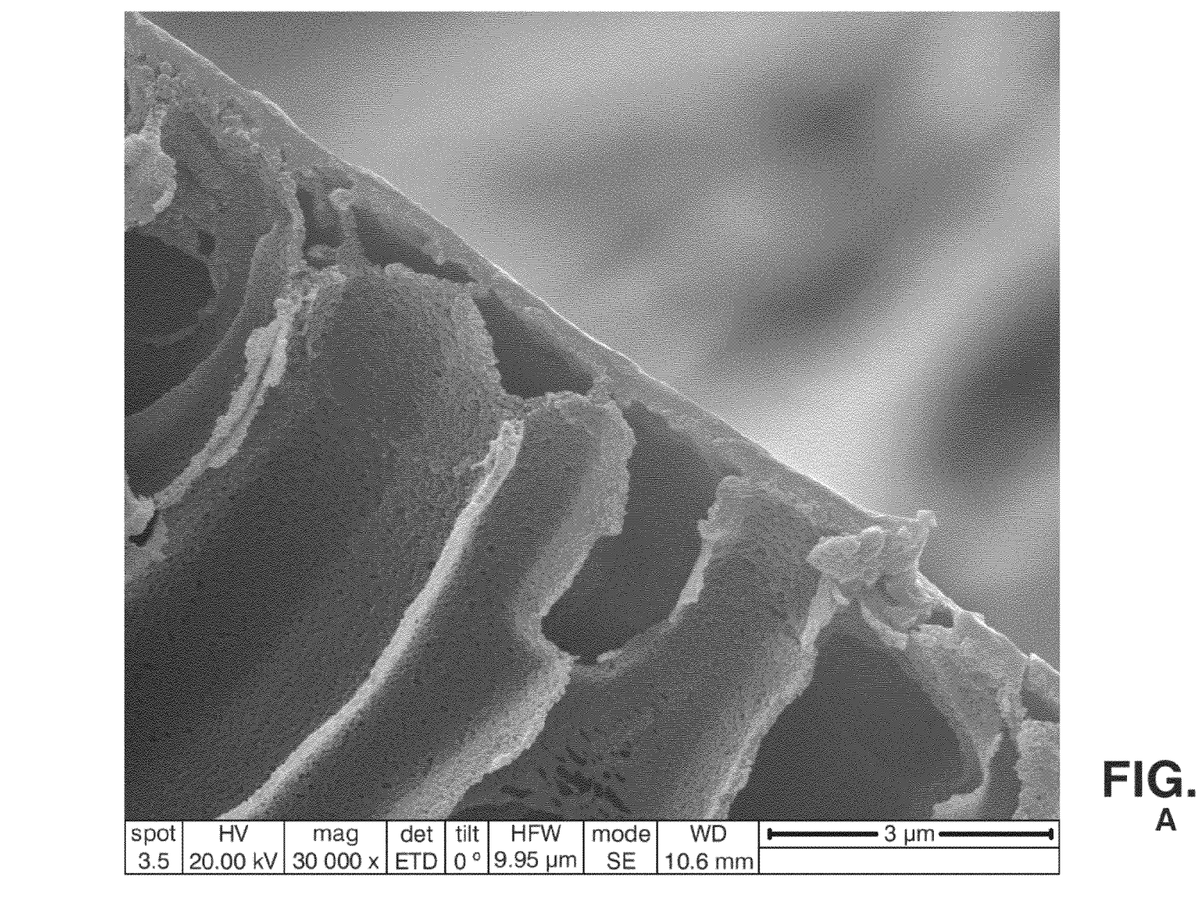
FIG. 4 shows an enlarged detail view of box A of FIG. 3.

The framed "part A" of FIG. 3 which shows the detailed image of the first microporous layer can clearly be observed in detail in FIG. 4.

The first layer can have a variable thickness, which depends on the temperature at which the polymer solution precipitation is carried out as described below. This FIG. 4 further shows how the macroporous channels start at the contact surface with the first layer, and initially have an approximate section between 2 and 4 microns.

The images of FIGS. 1, 2 and 3 clearly show how these macroporous channels extend towards the opposite surface, until ending, forming said outer surface of the macroporous layer and as the macroporous channels become further away from the first layer, they change direction and their sections increase.

In the images of FIGS. 1 to 3 how the channels widen is observed. The channels generally widen until experimentally determined sections comprised approximately between 5-20 microns.

The diaphragm of the invention has a mean porosity determined by means of the mercury porosimetry technique. Said porosity is generally comprised between 60% and 90%, and preferably between 75% and 85%. The equipment used these determinations is an Autopore IV porosimeter (Micromeritics), with four low pressure ports and two high pressure ports. The degasification conditions are 24 hours at 100° C. For the measurements a diaphragm sample size usually of 50 mg is used, the specific surface of which is 16.2 $m^2/g$.

The total thickness of the diaphragm of the invention can vary within a wide range. In a particular embodiment the total thickness is comprised between 100 and 800 microns, and preferably between 100 and 200 microns. The first layer has a thickness, which as described below, depends on the conditions for producing the diaphragm and which can vary within a wide range. Generally said thickness is comprised between 450 and 950 nm. In a particular embodiment the thickness is comprised between 500 and 900 nm. In another particular embodiment it is comprised between 550 and 850 nm, and in another particular embodiment between 570 and 650 nm.

As has been previously mentioned the thicknesses are much less than the thicknesses of some conventional diaphragms, which entails a significant savings in the amount of raw materials needed for their production and further allows that the energy needed to carry out the alkaline electrolysis is generally less than those needed with conventional diaphragms and that the process is more efficient. Furthermore, despite its small thickness, the diaphragm has high mechanical strength.

In a particular embodiment the macroporous channels starting at the contact surface between the first layer and the second layer of the diaphragm start with a direction perpendicular to that of the first layer The diaphragm of the invention can comprise, in addition to SPEEK, an additional component selected from the group consisting of ceramic particles, polyethersulfone and mixtures thereof for alkaline electrolysis.

In this sense, in a particular embodiment the diaphragm of the invention comprises SPEEK and ceramic particles, which are homogeneously distributed in the polymer matrix. The ceramic particle content, in principle, can vary within a wide range. Generally they are present in an amount comprised between 0.1% and 85% by weight, preferably between 0.5% and 40% by weight, more preferably between 1% and 20% by weight and even more preferably between 2% and 15% by weight with respect to the total weight of the diaphragm.

The ceramic particles are selected from nanoparticles having a mean size equal to or less than 100 nm, and microparticles having a mean size comprised between 1 and 5 microns.

The ceramic particles which can be used in the present invention can be, in principle, any ceramic particles.

The particles can be embedded in the polymer matrix or can be bound by means of chemical bonds to SPEEK. To achieve the latter, the ceramic particles are first reacted with specific chemical compounds or functionalizing agents, for example mercaptosilanes, through which the functionalized ceramic particles subsequently bind to SPEEK. The use of functionalizing agents favors the dispersion of the ceramic particles in the SPEEK polymer matrix and contributes to the better homogenization thereof. Examples of ceramic particles useful in the present invention are silica, zirconia, titania, clays, alumina, silicon carbide, titanates, zirconates, aluminosilicates, of any metal and mixtures thereof, among others.

In a particular embodiment the ceramic particles are zirconia ceramic particles. In another particular embodiment the zirconia particles are derivatized with 3-mercaptopropyltrimethoxysilane (MPTMS) or any other similar chemical compound, which is bound to the surface of the ceramic particle through the silane leaving the mercapto functional group (—SH) free at the other end for its reaction with SPEEK In another particular embodiment the diaphragm of the invention comprises, in addition to SPEEK, polyethersulfone, a polymer which is homogeneously distributed resulting in a composite and is present in an amount comprised between 0.5% and 40% by weight, preferably between 1% and 20% by weight, and more preferably between 5% and 13% by weight with respect to the total weight of the diaphragm.

The diaphragm of the invention is semipermeable and has a controlled porosity in the sense that it allows the passage of hydroxyl groups through it but prevents, however, the passage of the $H_2$ and $O_2$ gases generated in the alkaline electrolysis in each cell. The diaphragm of the invention, unlike the SPEEK diaphragms used in electrolysis by polymer electrolyte membrane (PEM), does not act as a proton carrier. The SPEEK sulfonic groups allow increasing the wetting of the diaphragm with respect to conventional PEEK and that the micropores are full of electrolyte blocking the passage of gas, unlike the SPEEK membranes used in PEM where the sulfonic groups are necessary for allowing proton migration therethrough.

In another aspect the present invention relates to a production method for producing the diaphragm of the invention as has been defined previously comprising the use of the chemically induced phase separation (CIPS) technique (Hentze, H. P. and M. Antonietti (2002). "Porous polymers and resins for biotechnological and biomedical applications." Reviews in Molecular Biotechnology 90(1): 27-53).

This method, hereinafter the production method of the invention, comprises the following steps:
(i) preparing a solution comprising SPEEK
(ii) casting the solution on a support for preparing a film with a controlled thickness
(iii) immersing the film in a non-solvent bath
(iv) washing
(v) drying and
(vi) cold rolling.

For preparing the SPEEK solution, PEEK (polyether ether ketone) is used as starting material. It is a thermoplastic polymer which has glass transition temperatures about 143° C. and 275° C. and which melts at about 343° C. It shows great mechanical strength and chemical resistance. Since it has low ionic conductivity and low hydrophilicity it is subjected to sulfonation to yield SPEEK and to allow it to be conductive so that it can be applied in alkaline electrolysis.

The PEEK serving as a starting material must have the lowest moisture content possible to prevent chemical property depletion which it undergoes if it retains water during sulfonation. The starting PEEK is generally used in pellet form and is subjected to dehydration. To that end it is typically kept in a stove at a temperature of 80-90° C. for at least 10 hours. Then, if it is not immediately used, it is preferably isolated to prevent contact with the ambient moisture until the moment of use to produce SPEEK.

Step (i) of the method comprises preparing a solution comprising SPEEK. Said preparation comprises PEEK sulfonation whereby an amount of PEEK is added to sulfuric acid. The amount of PEEK added can vary, in principle, within a wide range, but generally said amount is such that the PEEK concentration reached in sulfuric acid is comprised between 2 and 10% by weight, preferably between 4 and 6% by weight with respect to the total weight of the solution. The addition is performed under stirring so that the sulfonation is homogeneous, thus limiting polymer agglomeration. The sulfonation is left to occur for the time necessary until reaching a sulfonation degree comprised between 40% and 60%, suitable for the diaphragm manufacturing, SPEEK thus being produced. The sulfonation is carried out in an inert atmosphere. Variations in the temperature and the reaction time allow achieving the sulfonation degree desired in each case. In a particular embodiment the temperature is approximately 40° C. and the reaction time is generally comprised between 6 and 24 hours, and is typically 8 hours.

Then the casting of the SPEEK solution is carried out. The solution is cast by spreading a determined amount of the solution on a support plane, which in a particular embodiment consists of a glass plate. The thickness of the solution layer which is deposited is preferably homogeneous and is controlled by means of a blade or spatula working by way of a scraper. In a particular case the commercial device Doctor Blade is used.

Once the casting on the support ended, the polymer precipitation is carried out by immersing the polymer solution into a non-solvent medium, preferably distilled water, but soluble for sulfuric acid, at a temperature, which can vary within a wide range. In a particular embodiment the temperature is comprised between 0° C. and 80° C. The precipitation process allows producing the porous SPEEK structure of the present invention.

The inventors have observed that the thickness of the first layer of the diaphragm of the invention varies depending on the temperature of the non-solvent medium in which the polymer solution is immersed, such that the thickness thereof is inversely proportional to the temperature of the medium. Therefore the temperature of the medium can be varied depending on the thickness to be produced for this first layer.

After the membrane has precipitated it is washed with distilled water to remove the sulfuric acid residues retained therein until reaching a pH around 6 in the washing water. Typically the washing is carried out by immersing the precipitated membrane in distilled water for several hours with periodic water changes, until removing the acid residues and reaching said approximately a 6 pH value.

The next step of the diaphragm preparation method is drying, in which the moisture retained in the previous washing step is reduced. Since it is removed from the last washing bath, the diaphragm is soaked in distilled water therefore a first drying step is performed generally on blotting paper. The drying is subsequently continued in a conventional manner until reducing the water content to a value of 5-10%. The drying can be performed in many ways, both at temperatures comprised between 60 and 80° C., in a stove, and naturally at room temperature, both methods being different in the time necessary to achieve complete drying.

In the last step the diaphragm resulting from the previous step is cold rolled, the diaphragm of the invention being produced. The cold rolling is carried out to remove the possible membrane surface imperfections, such as high roughness, lumps, rippling, etc., and to prevent an operating performance drop in alkaline electrolysis due to the depositions of metal compound salt and of other substances which would reduce the active surface of the folded membrane formed on its surface. The cold rolling is carried out by means of the action of two rollers compressing the membrane and reducing and/or removing the presence of imperfections.

In a particular embodiment the diaphragm comprises SPEEK and PES. According to this particular embodiment the production method for producing it is the same as that previously described, except step (i) which comprises preparing a SPEEK and PES solution. This step comprises, as has been previously defined, PEEK sulfonation for which PEEK is added to sulfuric acid and a determined amount of PES amount is then poured in. The amount of PES added is variable, but it is such that the PES content in the diaphragm produced is generally comprised between 0.5% and 40% by weight, preferably between 1% and 20% by weight, and more preferably between 5% and 13% by weight with respect to the total weight of the diaphragm.

In another particular embodiment the diaphragm comprises SPEEK and ceramic particles. In this case the preparation method is also the same as that which has been previously described except step (i), which comprises preparing a SPEEK and ceramic particle solution. First, PEEK is added to sulfuric acid in the same amount previously described. Then the ceramic particles are added and it is stirred to reach a suitable particle dispersion in the resulting SPEEK solution.

The ceramic particles which can be used are selected from nanoparticles having a mean size equal to or less than 100 nm, and microparticles having a mean size comprised between 1 and 5 microns. The type of ceramic particles has been previously described. In a particular embodiment the ceramic particles can be used after having been previously functionalized with different functionalizing agents generally through silanization reactions allowing the chemical reaction between the ceramic particles and SPEEK, which favors their dispersion in the SPEEK polymer matrix.

The preparation of the SPEEK and functionalized ceramic particle solution comprises adding the ceramic particles to a suitable solvent under stirring to keep them in suspension, adding the functionalizing agent typically in excess for example in a 4:1 ratio (moles of functionalizing agent:moles of ceramic). The functionalization reaction can be carried out at different temperatures depending on various factors such as the type of ceramic and the agent selected in each case, and for a variable time, generally comprised between 6 and 24 hours. Once the functionalization ended, the resulting particles are filtered, washed with the same solvent used in the reaction to remove the excess of the functionalizing agent not bound to the ceramic particles, and the functionalized particles produced are dried, for example in a stove, typically at 80° C. for 12 hours.

In a particular embodiment the ceramic particles used are zirconia ceramic particles. In another particular embodiment the zirconia particles are previously functionalized with a functionalizing agent, for example with 3-mercaptopropyltrimethoxysilane (MPTMS), or any other similar functionalizing agent.

In another aspect the present invention relates to an alkaline electrolysis method comprising the use of at least one diaphragm of the invention previously defined. In a particular embodiment the method comprises the use of two or more diaphragms with sandwich-type structure.

The use of the diaphragm of the invention in alkaline electrolysis allows obtaining low HTO values, i.e., achieves a very effective separation of $H_2$ and $O_2$ gases. In this sense comparative alkaline electrolysis assays have been carried out using the diaphragm of the invention and the commercial Zirfon® diaphragm; both the voltage and the separation selectivity (see Example 2) are clearly shown to be significantly improved, i.e., the energy needed for producing the same amount of $H_2$ is less and the $H_2$ stream produced with the diaphragm of the invention contains much less $O_2$ than the streams produced in electrolyzers using Zirfon® as a diaphragm.

The diaphragm can be located in an alkaline electrolysis electrolyzer in any direction, i.e., with the first layer oriented towards the cathode or the anode. In a preferred embodiment the diaphragm is located with the first layer oriented towards the cathode.

As has been previously mentioned the diaphragm prevents the passage of the gases the first layer being microporous, the permeation-selective layer, whereas the macroporous channel layer support the diaphragm without increasing the electrical resistance of the assembly as a result of the high porosity due to its macroporous channels and its macroporous walls.

Therefore in another aspect the invention relates to an electrolyzer comprising at least one diaphragm according to the present invention. In particular the electrolyzer further comprises a tank, a cathode, an anode and the two compartments separated by the diaphragm of the invention. In a particular embodiment the electrolyzer for alkaline electrolysis comprises two or more diaphragms with sandwich-type structure.

The electrolytes for implementing the electrolysis method of the invention are conventional, typically NaOH or KOH in concentrations comprised between 20 and 40% by weight although higher and lower concentrations are also possible. The temperature at which the alkaline electrolysis method of the invention is carried out is generally comprised between 40 and 90° C. although higher and lower temperatures are also possible.

Illustrative examples of the invention which are set forth to better understand the invention and which must not be considered as limiting to the scope of the invention are presented below.

EXAMPLES

For synthesizing diaphragms, PEEK in pellet form (LATI Ibérica®), 96-98% sulfuric acid (Sigma-Aldrich), polyethersulfone (PES) (LATI Ibérica®), and nanozirconia with a mean particle size less than 100 nm (Sigma Aldrich®) were used.

Example 1

Preparation of the Membranes 9 g of PEEK previously dried in a stove at 80° C. for 10 hours were taken and were added to 100 mL of 96-98% sulfuric acid, therefore having a 4.7% PEEK concentration in the polymer solution. The three neck flask used allows sweeping with argon at all times to keep the reaction atmosphere with the lowest moisture content possible. After 8 hours at 40° C. it was removed from the sulfonation bath and the diaphragm was then prepared. To that end an amount of solution was placed on the glass support and, with the aid of Doctor Blade, a 600 micron thick polymer film was made. It was then immersed in the non-solvent bath (distilled water, temperature 20° C.) to cause the polymer precipitation with the desired characteristics for the diaphragm. Due to possible sulfuric acid residues inside the diaphragm, the latter was washed with distilled water until the pH thereof reached values close to 6. Finally the diaphragm was dried in laboratory paper for 14 hours, after which the cold rolling was done.

The diaphragm thus produced has a thickness of 300 microns with a 42% sulfonation degree (measured by H-NMR technique).

Example 2

Comparative example of alkaline electrolysis in the same operating conditions using a commercial Zirfon® membrane and 3 different diaphragms according to the invention.

The experiments were performed in a specific testbed developed by P&ID Technólogies® consisting of a power source, a single cell and the balance of plant necessary for simulating a commercial electrolyzer.

A comparison of operating results in a low power alkaline electrolyzer with natural recirculation, working at 40° C. with potassium hydroxide (33% by weight) as an electrolyte and with a current density of 0.4 A/cm² can be observed in the following table.

The variables shown for their comparison are the voltage needed to carry out the electrolysis, generated by a current source establishing the electric current for having the stipulated current density with a given voltage consumption; and the HTO, i.e., the hydrogen content present in the oxygen stream at the output of the gas separator which recirculates the electrolyte entrained by the gas stream.

| Diaphragm | Voltage (V) | HTO (%) |
| --- | --- | --- |
| Zirfon ® | 2.54 | 0.31 |
| SPEEK | 2.53 | 0.17 |
| SPEEK•PES | 2.50 | 0.21 |
| SPEEK•microZrO$_2$ | 2.46 | 0.14 |

The diaphragms of the invention are capable of operating with significantly lower voltage consumptions than the commercial material, especially with composite diaphragms (with PES) or with ceramic particles. An optimization is further achieved in the hydrogen-oxygen separation as the HTO value is reduced by more than 50% whereby streams that are purer than those produced using commercial Zirfon® membranes were produced.

The use of the diaphragm of the invention involves optimizing raw material and resource use. According to the present invention SPEEK diaphragms have been prepared with thicknesses of only 100 microns with respect to the thickness of 400-500 microns [International Journal of Hydrogen Energy Volume 36, Issue 13, July 2011, 7799-7806] measured for Zirfon®, which entails a production cost reduction, and furthermore, without causing problems in the mechanical strength of the diaphragm produced.

The invention claimed is:

1. Porous diaphragm comprising SPEEK for alkaline electrolysis comprising:
   a first microporous layer, the thickness of the first layer is comprised between 450 nm and 950 nm and;
   a second layer having macroporous channels,
   where said macroporous channels start at the contact surface between the first and the second layer then extending and forming the outer surface of said second layer, and where said macroporous channels increase in section and change direction as they approach said outer surface of said second layer, and wherein the wall of said macroporous channels has macropores;
   the porous diaphragm
   having a porosity comprised between 60% and 90%, measured with the mercury porosimetry technique and a thickness comprised between 100 and 800 microns.

2. Diaphragm according to claim 1 wherein the porous diaphragm having a porosity comprised between 75% and 85%.

3. Diaphragm according to claim 1, wherein the thickness thereof is comprised between 100 and 200 microns.

4. Diaphragm according to claim 1, wherein the macroporous channels starting at the contact surface between the first and the second layer start with a direction perpendicular to that of the first layer.

5. Diaphragm according to claim 1 further comprising a component selected from the group consisting of ceramic particles, polyethersulfone and mixtures thereof.

6. Diaphragm according to claim 5, comprising, in addition to SPEEK, ceramic particles which are homogeneously distributed therein and are present in an amount comprised between 2% and 15% by weight.

7. Diaphragm according to claim 6, wherein the ceramic particles are selected from nanoparticles having a mean size equal to or less than 100 nm and microparticles having a mean size comprised between 1 and 5 microns.

8. Diaphragm according to claim 6, wherein the ceramic particles are zirconia ceramic particles.

9. Diaphragm according to claim 5, comprising, in addition to SPEEK, polyethersulfone (PES) in an amount comprised between 0.5% and 40% by weight, preferably between 1% and 20% by weight, and more preferably between 5% and 13% by weight.

10. Production method for producing the diaphragm as defined in claim 1 comprising the following steps:
    (i) preparing a solution adding PEEK to sulphuric acid,
    (ii) casting the solution on a support for preparing a film with a controlled thickness,
    (iii) immersing the film in a distilled water bath, the bath temperature is comprised between 0° C. and 80° C.,
    (iv) washing,
    (v) drying and
    (vi) cold rolling.

11. Alkaline electrolysis method comprising the use of at least one diaphragm as defined in claim 1.

12. Alkaline electrolysis method according to claim 11, comprising the use of two or more diaphragms with a sandwich-type structure.

13. Alkaline electrolysis electrolyzer comprising at least one diaphragm as defined in claim 1.

14. Alkaline electrolysis electrolyzer according to claim 13, comprising two or more diaphragms with a sandwich-type structure.

* * * * *